US012023300B2

(12) United States Patent
Koh et al.

(10) Patent No.: US 12,023,300 B2
(45) Date of Patent: Jul. 2, 2024

(54) ROTATIONAL HIGH FREQUENCY CHEST WALL OSCILLATION PUMP

(71) Applicant: HILL-ROM SERVICES PTE. LTD., Singapore (SG)

(72) Inventors: Qingqing Koh, Singapore (SG); Daryl Zhi Wei Ho, Singapore (SG)

(73) Assignee: HILL-ROM SERVICES PTE. LTD., Singapore (SG)

( * ) Notice: Subject to any disclaimer, the term of this patent is extended or adjusted under 35 U.S.C. 154(b) by 592 days.

(21) Appl. No.: 17/358,371

(22) Filed: Jun. 25, 2021

(65) Prior Publication Data

US 2021/0401662 A1 Dec. 30, 2021

Related U.S. Application Data

(60) Provisional application No. 63/045,350, filed on Jun. 29, 2020.

(51) Int. Cl.
*A61H 9/00* (2006.01)
*A61H 31/00* (2006.01)

(52) U.S. Cl.
CPC ......... *A61H 9/0007* (2013.01); *A61H 9/0078* (2013.01); *A61H 31/00* (2013.01); *A61H 2201/1238* (2013.01)

(58) Field of Classification Search
CPC .... A61H 9/0007; A61H 9/0078; A61H 31/00; A61H 2201/1238; A61H 2201/1215; A61H 2201/1619; A61H 2201/165; A61H 23/006; A61H 23/008; A61H 23/02; A61H 23/04; A61M 16/0057; A61M 16/006; A61M 16/0063; A61M 16/0075; A61M 16/0081; A61M 16/0084; F04B 43/025; F04B 43/026; F04B 9/04; F04B 9/052; F04B 9/047
USPC ........................................................... 74/609
See application file for complete search history.

(56) References Cited

U.S. PATENT DOCUMENTS

| | | | |
|---|---|---|---|
| 7,316,658 | B2 | 1/2008 | Gagne |
| 7,537,575 | B2 | 5/2009 | Hansen et al. |
| 8,087,316 | B2 | 1/2012 | Holtgraver |
| 8,353,207 | B2 | 1/2013 | Hakansson |
| 8,845,562 | B2 | 9/2014 | Receveur et al. |
| 8,936,447 | B2 | 1/2015 | Abal |
| 9,222,818 | B2 | 12/2015 | Hakansson et al. |
| 9,316,249 | B2 | 4/2016 | Yoshizawa et al. |
| 9,372,662 | B2 | 6/2016 | Hakansson et al. |
| 2013/0118175 | A1 | 5/2013 | Eisenmenger et al. |
| 2015/0025425 | A1 | 1/2015 | Mitchell |

FOREIGN PATENT DOCUMENTS

CN 104039376 A 9/2014

OTHER PUBLICATIONS

First Office Action from the Chinese Patent Office for Chinese Patent Application No. 2021107265516 dated Jul. 28, 2023, and its English translation (14 pages).

*Primary Examiner* — Kendra D Carter
*Assistant Examiner* — Arielle Wolff
(74) *Attorney, Agent, or Firm* — Barnes & Thornburg LLP

(57) ABSTRACT

Devices, systems, and methods for high frequency chest wall oscillation pumps can include a pressure cavity, defined by one or more diaphragms, for fluid pressurization to provide pressure oscillation, a drive assembly can be arranged to provide reciprocation to a plunger assembly to move the one or more diaphragms to generate fluid pressure.

25 Claims, 11 Drawing Sheets

ROTATIONAL HIGH FREQUENCY CHEST WALL OSCILLATION PUMP

CROSS REFERENCE

This Utility patent application claims the benefit of priority under 35 U.S.C. § 119 to U.S. Provisional Patent Application No. 63/045,350, filed on Jun. 29, 2020, entitled ROTATIONAL HIGH FREQUENCY CHEST WALL OSCILLATION PUMP, the contents of which are hereby incorporated by reference in their entirety, including but without limitation, those portions concerning high frequency chest wall oscillation.

FIELD

The present disclosure relates to devices, systems, and methods for chest wall therapy. More specifically, the present disclosure relates to devices, systems, and methods for high frequency chest wall oscillation (HFCWO) therapy.

High frequency oscillatory impact to a patient's chest wall can encourage freeing of mucus from the upper respiratory tract. For example, patient suffering from mucus build up, such as cystic fibrosis patients, can be successfully treated with HFCWO therapy. Yet, generating high frequency oscillation force can be challenging.

SUMMARY

The present application discloses one or more of the features recited in the appended claims and/or the following features which, alone or in any combination, may comprise patentable subject matter.

According to an aspect of the present disclosure, a high frequency chest wall oscillation pump may comprise a pressure cavity for fluid pressurization to provide pressure oscillation, the pressure cavity defined at least in part by at least one diaphragm arranged for movement between a first position and a second position, a drive assembly including a drive shaft arranged for rotational drive and at least one cam coupled with the drive shaft to receive rotational drive, and a plunger assembly including at least one plunger engaged with the at least one diaphragm and coupled with the drive assembly for radial reciprocating motion to move the at least one diagram between the first position and the second position to generate fluid pressure.

In some embodiments, the at least one plunger may include at least three plungers each arranged circumferentially spaced apart from each other about a rotational axis of the drive shaft. The plunger assembly may include a track assembly including at least one guide track assembly engaged with each of the at least three plungers for guiding reciprocating motion. The track assembly may include first and second frame portions spaced apart from each other. The at least one guide track assembly may include at least three guide tracks defined by each of the first and second frame portions.

In some embodiments, each plunger may engage one of the guide tracks of each of the first and second frame portions. The guide tracks of the first and second frame portions which engage each of the number of plungers may be arranged at the same circumferential position about the rotational axis. The guide tracks which engage the same plunger may extend radially at the same angle about the rotational axis.

In some embodiments, the at least three plungers may be arranged circumferentially spaced apart from each other by about 120 degrees about the rotational axis. Each plunger may extend longitudinally along the rotational axis and may engage the first and second frame portions at longitudinal ends thereof. Each plunger may be arranged radially outward of the at least one diaphragm.

In some embodiments, the at least one diaphragm may include a diaphragm bladder arranged to engage with each of the at least three plungers. In some embodiments, radial motion of the at least three plungers may compress the diaphragm bladder to increase fluid pressure. The at least one diaphragm may include a diaphragm bladder extending along a rotational axis of the drive shaft.

In some embodiments, the diaphragm bladder may define the pressure cavity within a bladder compartment. The drive shaft may extend through diaphragm bladder. The drive shaft may be formed to include a pressure passage extending through at least a portion thereof.

In some embodiments, the drive shaft may include a number of openings in communication with the pressure passage and the pressure cavity to communicate fluid therebetween. The pressure passage may include a pressure port for communication with a high frequency chest wall oscillation garment to communicate pressure between the pressure cavity and the high frequency chest wall oscillation garment. Each of the at least one cam may be engaged with the at least one plunger for communicating rotational force of the drive shaft for movement of the at least one plunger. In some embodiments, each of the at least one cam may include a drive plate extending radially from the drive shaft and rotationally coupled with the drive shaft to receive rotational drive.

In some embodiments, each drive plate may include at least one cam surface engaged with the at least one plunger. Each of the at least one cam surface may be defined within a radial wall of the drive plate. Each of the one cam surface may be formed as a radially inward facing surface engaged with the at least one plunger to drive the at least plunger radially in reciprocal motion.

In some embodiments, each of the at least one cam surface may be formed as an annular surface. Each of the at least one cam surface may be formed to have triangular shape. The at least one cam may include at least two cams each engaged with the at least one plunger. The at least one plunger may include at least three plungers each engaged with each of the at least two cams.

In some embodiments, each of the at least one plunger may include a plunger body extending longitudinally along a rotational axis of the drive shaft, the body defining a curved surface on a radially inner side. The curved surface may define a convex curvature profile along the longitudinal extent of the plunger body. In some embodiments, each at least one plunger may include at least one track follower connected with the plunger body for engagement with a track assembly of the drive assembly for guiding reciprocating motion of the at least one plunger.

In some embodiments, the at least one track follower may include at least two track followers. One track follower of the at least two track followers may be connected at each longitudinal end of the plunger body. Each at least one track follower may be formed as an elongated-circular projection extending longitudinally from the plunger.

In some embodiments, each at least one plunger may include at least one cam follower for engagement with the at least one cam of the drive assembly to receive cam actuation. Each at least one cam follower may be formed as a cylindrical projection extending longitudinally from the plunger body. Each at least one cam follower may include at least two cam followers. One cam follower of the at least two cam followers may be connected at each longitudinal end of the plunger body. In some embodiments, the high frequency chest wall oscillation pump may comprise a base pressure source in communication with the pressure cavity to provide base line pressure.

A high frequency chest wall oscillation system may comprise a therapy garment for receiving pressurized fluid pulses to provide high frequency chest wall oscillation therapy to a patient. The high frequency chest wall oscillation system may comprise a high frequency oscillation pump which may comprise a pressure cavity for fluid pressurization to provide pressure oscillation. The pressure cavity may be defined at least in part by at least one diaphragm arranged for movement between a first position and a second position. The high frequency chest wall oscillation system may comprise a drive assembly including a drive shaft arranged for rotational drive and at least one cam coupled with the drive shaft to receive rotational drive. The high frequency chest wall oscillation system may comprise a plunger assembly including a number of plungers engaged with the at least one diaphragm and coupled with the drive assembly for radial reciprocating motion to move the at least one diagram between the first position and the second position to generate fluid pressure. The high frequency chest wall oscillation system may comprise a fluid conduction system comprising at least one conduit for connection to communicate fluid pressure between the high frequency oscillation pump and the garment.

In some embodiments, the high frequency oscillation pump may further comprise a motor drive coupled with the drive shaft to provide rotational force. The drive shaft may extend from the motor drive along a rotational access. The drive shaft may be rotationally coupled with the at least one cam to provide rotational drive.

In some embodiments, each at least one cam may comprise at least one drive plate coupled concentrically with the drive shaft for rotational drive. Each at least drive plate may define a cam surface engaged with the number of plungers to convert rotational motion of the at least one drive plate to compressive force of the number of plungers on the at least one diaphragm. The at least one diaphragm may include a diaphragm bladder arranged to engage with each of the at least three plungers.

In some embodiments, the high frequency oscillation pump may further comprise a base pressure source in communication with the pressure cavity to provide base line pressure. The at least one diaphragm may comprise a diaphragm bladder defining the pressure cavity therein and providing resilient return force opposing compression by the number of plungers. During a return period of the at least one cam the number of plungers may be driven radially outward under the resilient return force.

In some embodiments, the return period may include a cam stroke allowing radially outward movement of the number of cams. The resilient return force may be the only return force opposing compression of the number of plungers during a compression period. The compression period may include a cam stroke driving radially inward movement of the number of cams.

In some embodiments, the plunger assembly may include a track assembly including at least one guide track assembly engaged with each of the number of plungers for guiding reciprocating motion. The track assembly may include first and second frame portions spaced apart from each other. The at least one guide track assembly may include a number of guide tracks corresponding with the number of plungers. The number of guide tracks may be defined by each of the first and second frame portions.

In some embodiments, each of the number of plungers may engage one of the guide tracks of each of the first and second frame portions. The guide tracks of the first and second frame portions which engage each of the number of plungers may be arranged at the same circumferential position about the rotational axis. The guide tracks which engage same one of the number of plungers may extend radially at the same angle about a rotational axis of the drive shaft.

In some embodiments, the guide tracks of the same frame portion may be arranged circumferentially spaced apart from each other by about 120 degrees about the rotational axis. Each of the number of plungers may extend longitudinally along a rotational axis of the drive shaft and engages the first and second frame portions at longitudinal ends thereof.

According to another aspect of the present disclosure, a high frequency chest wall oscillation pump may comprise a cylindrical bladder defining a pressure cavity for fluid pressurization to provide pressure oscillation, the bladder arranged for resilient operation between an expanded state in which the pressure cavity has an expanded volume and a compressed state in which the pressure cavity has a compressed volume less than the expanded volume, a squeeze assembly arranged for providing oscillating compression of the bladder between the expanded and compressed states. The squeeze assembly may include a drive shaft arranged for rotational drive and at least one cam coupled with the drive shaft to receive rotational drive, and at least one plunger coupled with the at least one cam for radial reciprocating motion to squeeze the bladder from the expanded state to the compressed state to generate fluid pressure.

In some embodiments, each of the at least one plungers is arranged radially outward of the cylindrical bladder. The at least one plunger may include at least two plungers. The at least at least two plungers may be circumferentially spaced apart from each other. Each of the at least two plungers may have equal circumferential spacing apart from each other.

In some embodiments, each of the at least one cam may be engaged with the at least one plunger for communicating rotational force of the drive shaft for movement of the at least one plunger. Each of the at least one cam may include a drive plate extending radially from the drive shaft and rotationally coupled with the drive shaft to receive rotational drive. Each drive plate may include at least one cam surface engaged with the at least one plunger.

In some embodiments, each of the at least one cam surface may be defined within a radial wall of the drive plate. Each of the one cam surface may be formed as a radially inward facing surface engaged with the at least one plunger to drive the at least one plunger radially in reciprocal motion. Each of the at least one cam surface may be formed as an annular surface. Each of the at least one cam surface may be formed to have triangular shape.

In some embodiments, the at least one cam may include at least two cams each engaged with the at least one plunger. The at least one plunger may include at least three plungers each engaged with each of the at least two cams. Each of the at least one plunger may include a plunger body extending longitudinally along a rotational axis of the drive shaft, the body defining a curved surface on a radially inner side. The curved surface may define a convex curvature profile along the longitudinal extent of the plunger body.

In some embodiments, each at least one plunger may include at least one track follower connected with the plunger body for engagement with a track assembly for guiding reciprocating motion of the at least one plunger. The at least one track follower may include at least two track followers, one track follower of the at least two track followers connected at each longitudinal end of the plunger body. Each at least one track follower may be formed as an elongated-circular projection extending longitudinally from the plunger body.

In some embodiments, each at least one plunger may include at least one cam follower for engagement with the at least one cam to receive cam actuation. Each at least one cam follower may be formed as a cylindrical projection extending longitudinally from the plunger body. Each at least one cam follower may include at least two cam followers, one cam follower of the at least two cam followers connected at each longitudinal end of the plunger body. In some embodiments, the high frequency chest wall oscillation pump may further comprise a base pressure source in communication with the pressure cavity to provide base line pressure. A high frequency chest wall oscillation system may comprise a therapy garment coupled with the high frequency chest wall oscillation pump to receive pressure oscillation.

According to another aspect of the present disclosure, a high frequency chest wall oscillation pump may comprise a pressure cavity for fluid pressurization to provide pressure oscillation, the pressure cavity defined at least in part by at least one diaphragm arranged for movement between a first position and a second position, a squeeze assembly including a drive shaft arranged for rotational drive and at least one cam coupled with the drive shaft to receive rotational drive, and at least one squeeze body coupled with the at least one cam for radial reciprocating motion to squeeze the at least one diaphragm from one to the other of the first and second positions to generate fluid pressure within the pressure cavity. The squeeze assembly may be adapted for more than one oscillation of the at least one diaphragm between the first and second positions for each revolution of the drive shaft.

In some embodiments, each of the at least one squeeze body may be arranged radially outward of the at least one diaphragm. The at least one squeeze body may include at least two squeeze bodies. The at least at least two squeeze bodies may be circumferentially spaced apart from each other.

In some embodiments, each of the at least two squeeze bodies may have equal circumferential spacing apart from each other. Each of the at least one cam may be engaged with the at least one squeeze body for communicating rotational force of the drive shaft for movement of the at least one squeeze body. Each of the at least one cam may include a drive plate extending radially from the drive shaft and rotationally coupled with the drive shaft to receive rotational drive.

In some embodiments, each drive plate may include at least one cam surface engaged with the at least one squeeze body. Each of the at least one cam surface may be defined within a radial wall of the drive plate. Each of the at least one cam surface may be formed as a radially inward facing surface engaged with the at least one squeeze body to drive the at least one squeeze body radially in reciprocal motion.

In some embodiments, each of the at least one cam surface may be formed as an annular surface. Each of the at least one cam surface may be formed to have triangular shape. In some embodiments, the at least one cam may include at least two cams each engaged with the at least one squeeze body.

In some embodiments, the at least one squeeze body may include at least three squeeze bodies each engaged with each of the at least two cams. Each of the at least one squeeze body may extend longitudinally along a rotational axis of the drive shaft. Each of the at least one squeeze body may define a curved surface on a radially inner side. In some embodiments, the curved surface may define a convex curvature profile along the longitudinal extent of the squeeze body.

In some embodiments, each at least one squeeze body may include at least one track follower for engagement with a track assembly for guiding reciprocating motion of the at least one squeeze body. The at least one track follower may include at least two track followers. One track follower of the at least two track followers may be connected at each longitudinal end of the at least one squeeze body.

In some embodiments, each at least one track follower may be formed as an elongated-circular projection extending longitudinally from the at least one squeeze body. Each at least one squeeze body may include at least one cam follower for engagement with the at least one cam to receive cam actuation. Each at least one cam follower may be formed as a cylindrical projection extending longitudinally from the at least one squeeze body.

In some embodiments, each at least one cam follower may include at least two cam followers. One cam follower of the at least two cam followers may be connected at each longitudinal end of the squeeze body. In some embodiments, the high frequency chest wall oscillation pump may further comprise a base pressure source in communication with the pressure cavity to provide base line pressure. In some embodiments, the squeeze assembly may be adapted for three oscillations of the at least one diaphragm between the first and second positions to generate three pressure pulses for each revolution of the drive shaft. A high frequency chest wall oscillation system may comprise a therapy garment coupled with the high frequency chest wall oscillation pump to receive pressure oscillation.

Additional features, which alone or in combination with any other feature(s), including those listed above and those listed in the claims, may comprise patentable subject matter and will become apparent to those skilled in the art upon consideration of the following detailed description of illustrative embodiments exemplifying the best mode of carrying out the invention as presently perceived.

BRIEF DESCRIPTION OF THE DRAWINGS

The detailed description particularly refers to the accompanying figures in which.

DETAILED DESCRIPTION

Figure 1:
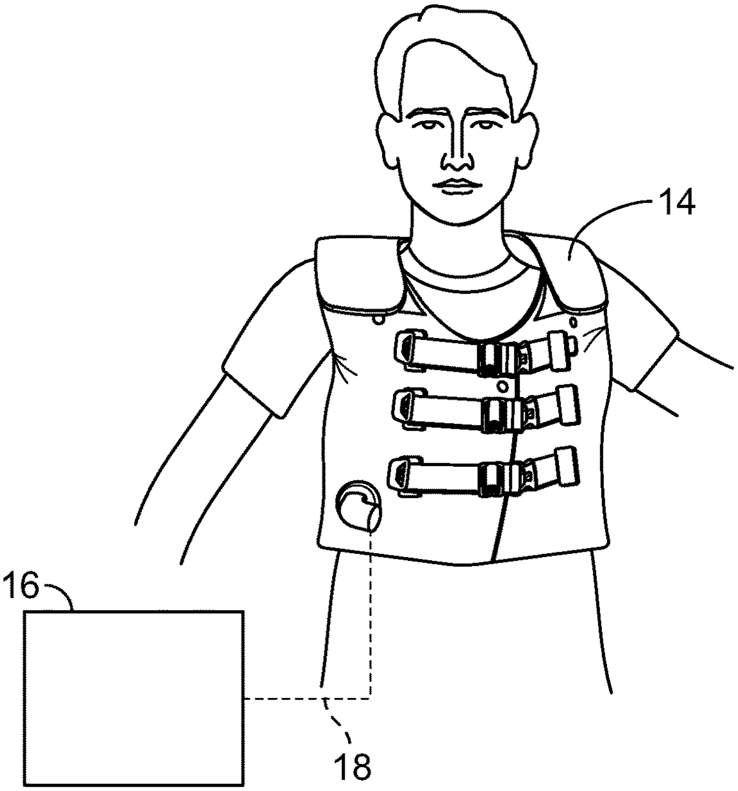
FIG. 1 is a perspective view of a high frequency chest wall oscillation (HFCWO) system including a therapy garment (vest) and a force generator embodied as a HFCWO pump.

For the purposes of promoting an understanding of the principles of the disclosure, reference will now be made to a number of illustrative embodiments illustrated in the drawings and specific language will be used to describe the same.

Material within the upper respiratory system, for example, mucus build-up in the upper respiratory tract of cystic fibrosis patients, can be effectively treated by encouraging expectoration. High Frequency Chest Wall Oscillation (HFCWO) can assist in loosening build-up by applying repetitive force of impact to the patient's chest wall area.

Referring now to FIG. 1, a HFCWO system 12 is shown including a chest engagement device 14 embodied as a wearable therapy garment vest, a therapeutic force generator 16 in communication with the vest 14 via one or more fluid hoses 18 to provide pressure force communicated by the vest 14 to the patient's torso region to provide impact force to the patient's chest wall. The vest 14 illustratively includes one or more pressurizable chambers that are arranged in communication with the HFCWO pump 16 to receive successive pressurization and depressurization to inflate and deflate imposing an oscillating impact force on the patient. The application of successive impact force to impose high frequency oscillation of the chest wall as a therapy regime can assist in dislodging material, such as mucus build-up, from the upper respiratory tract.

Figure 2:
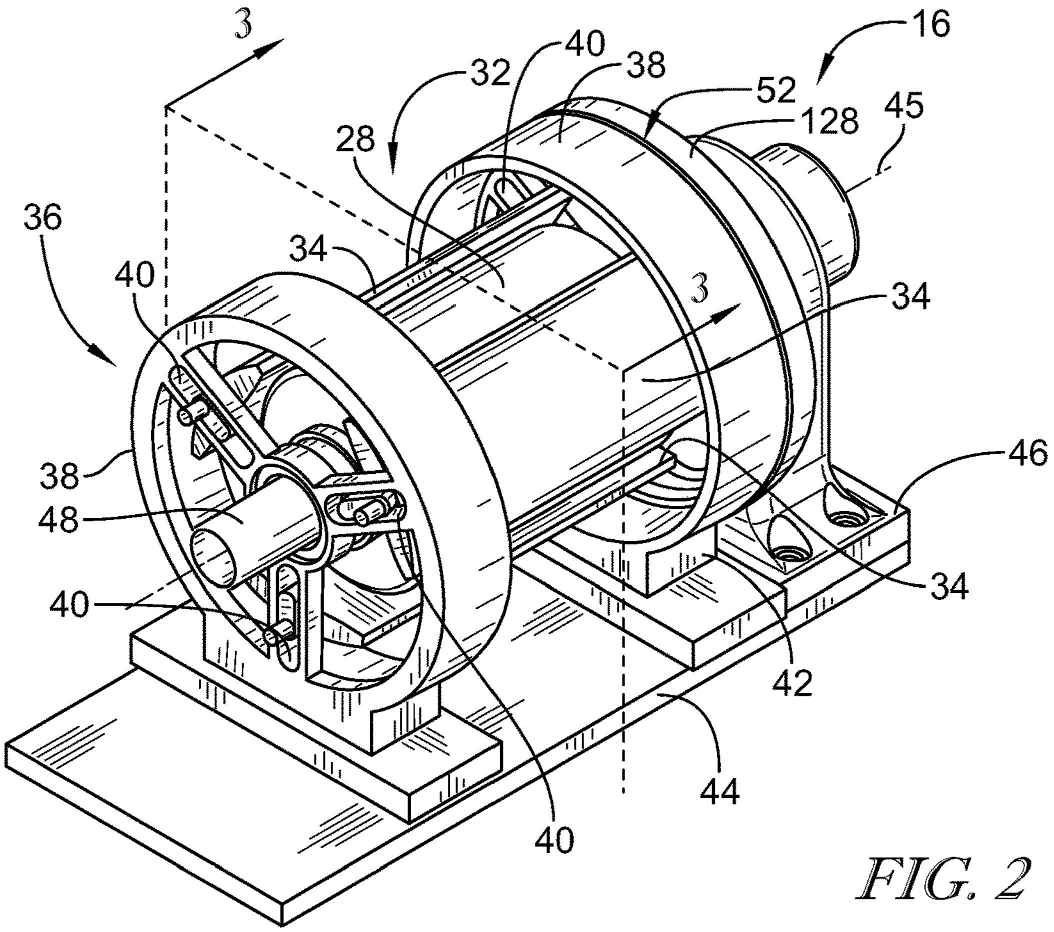
FIG. 2 is a perspective view of the force generator of FIG. 1 having outer covering(s) removed to reveals internals including a bladder defining a pressure cavity therein, a plunger assembly for engaging the bladder to provide fluid pressure and a drive assembly for providing drive force to the plunger assembly.

Referring to FIG. 2, the HFCWO pump 16 includes a pump housing which is omitted to reveal internal contents. In the illustrative embodiment, the HFCWO pump 16 is embodied as an HFCWO pump adapted to provide oscillating fluid pressure to provide HFCWO force in the vest 14. The HFCWO pump 16 can include a user interface, such as a touch sensitive screen, and one or more pressure connection portions for receiving connection of the hose 18 to communicate pressurized fluid with the vest 14.

As discussed in additional detail herein, the HFCWO pump 16 illustratively includes a bladder 28 defining a pressure cavity 30 therein. The bladder 28 is embodied as a diaphragm moveable between expanded and contracted positions to alter the pressure cavity 30 between larger and smaller volumes to generate pressure oscillation for communication with the vest 14. In some embodiments, the pressure cavity 30 may be defined by more than one moveable diaphragm. The HFCWO pump 16 illustratively includes a plunger assembly 32 including a number of plungers 34 arranged for radially reciprocating motion while engaged with the bladder 28 to drive compression of the bladder 28 by squeezing the bladder 28 between the expanded and contracted positions.

Figure 3:
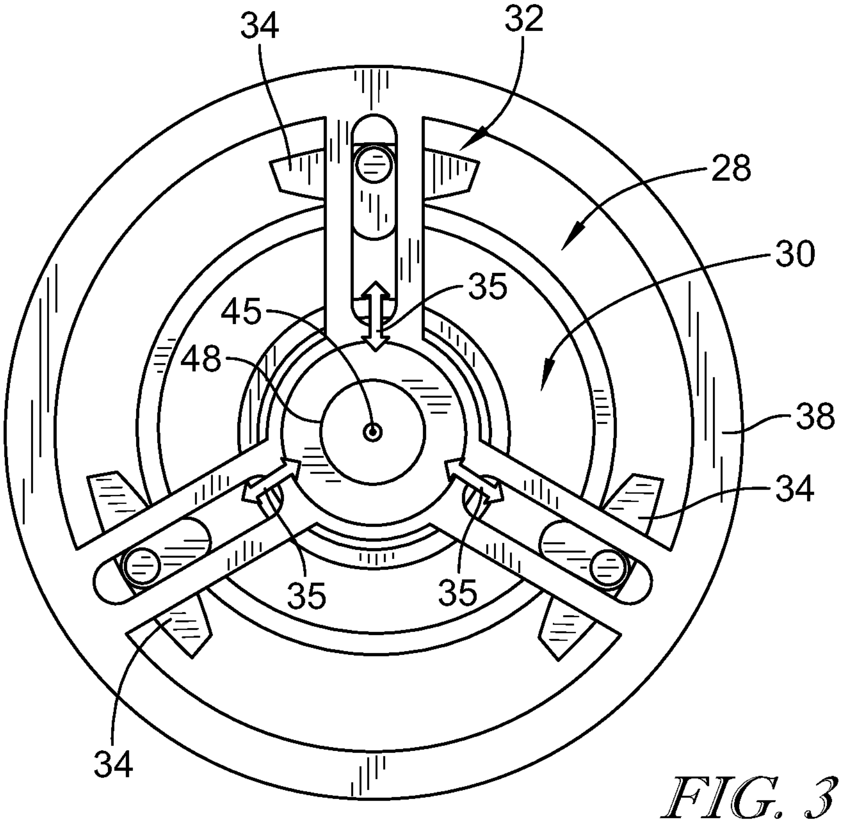
FIG. 3 is an elevation view of internal portions of the pump taken along the cross-sectional plane 3-3 in FIG. 2 showing that a pressure cavity is defined by a bladder which can be engaged by a plunger assembly including plungers arranged for reciprocating movement, guided by a guide assembly, to move the bladder as a diagram between expanded and contracted positions, the bladder presently being arranged in the expanded position.
Figure 4:
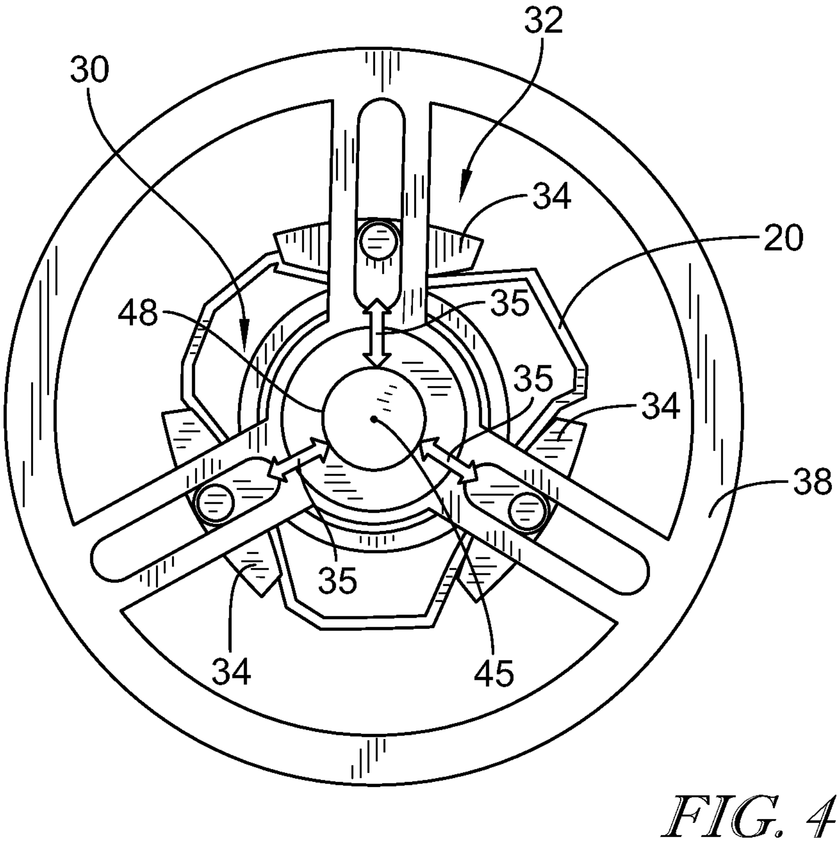
FIG. 4 is an elevation view of internal portions of the pump taken along the cross-sectional plane 3-3 in FIG. 2, similar to FIG. 3, showing that the plunger assembly has been moved such that the plungers are reciprocated radially inward from their positions in FIG. 3 to compress the bladder as a diagram to a contracted position to provide pressure increase for communication with the therapy garment.

Referring now to FIGS. 3 and 4, a diagrammatic cross-section visualization of internal portions of the HFCWO pump 16 omits the pump housing among other portions to illustrate operation of the bladder 28 and plunger assembly 32. The plungers 34 of the plunger assembly 32 are each arranged to engage the bladder 28 for reciprocating radial motion as indicated by arrows 35. As shown in FIG. 3, the plungers 34 are illustratively arranged in a radially outward position to allow the bladder 28 to have the expanded position, and thus the pressure cavity 30 to have the larger volume.

As shown in FIG. 4, the plungers 34 are each arranged in a radially inward position relative to the radially outward position of FIG. 3, thereby driving compression of the bladder 28 to the contracted position and compressing the pressure cavity 30 to the lower volume to increase pressure within the pressure cavity 30 for communication to the vest 14. As discussed in additional detail herein, the plunger assembly 32 includes a track assembly 36 for guiding reciprocating motion of the plungers 34.

Figure 5:
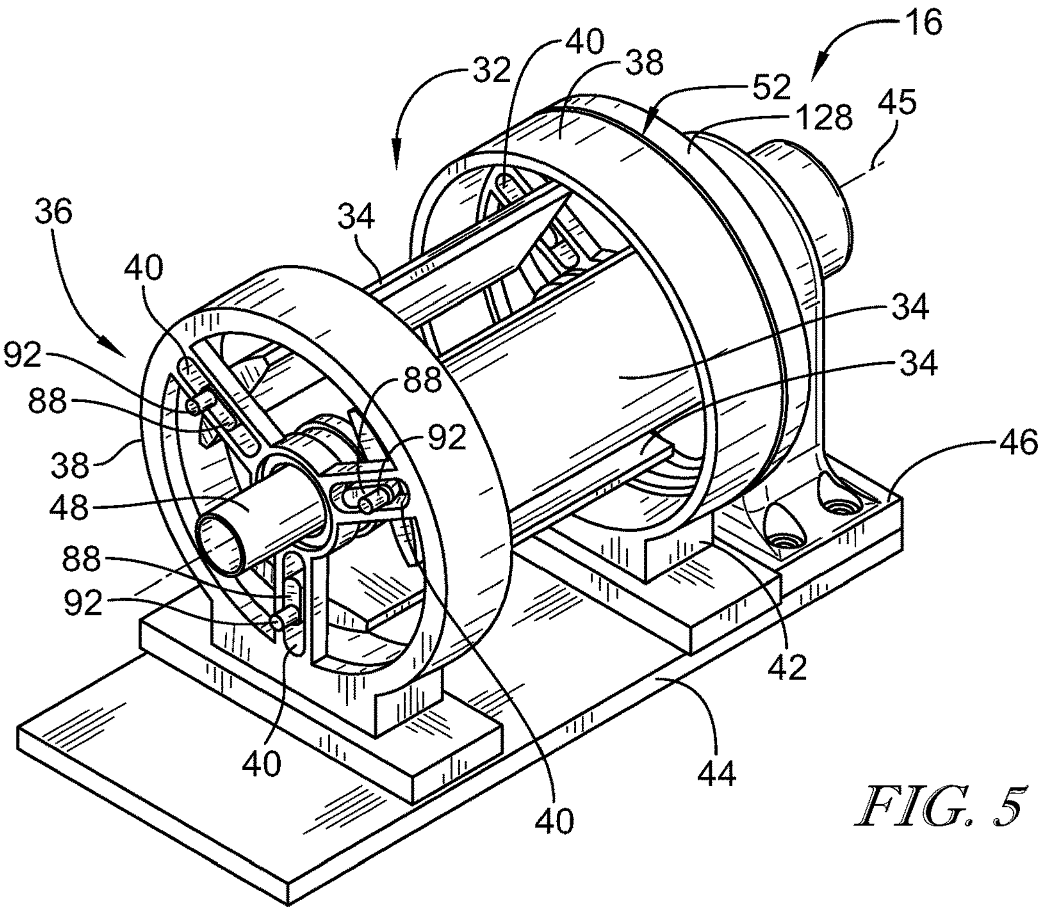
FIG. 5 is a perspective view of internal portions of the pump of FIGS. 1-4 having an outer covering removed and omitting the bladder to reveal internals, and showing the plungers are arranged reciprocated to a radially outward position, corresponding with their position in FIG. 3, and showing that the pump includes a drive shaft of a drive assembly extending along a rotational axis to drive the plunger assembly for radial reciprocating motion, and further showing that frame portions are mounted on a base to support the drive and plunger assemblies.
Figure 6:
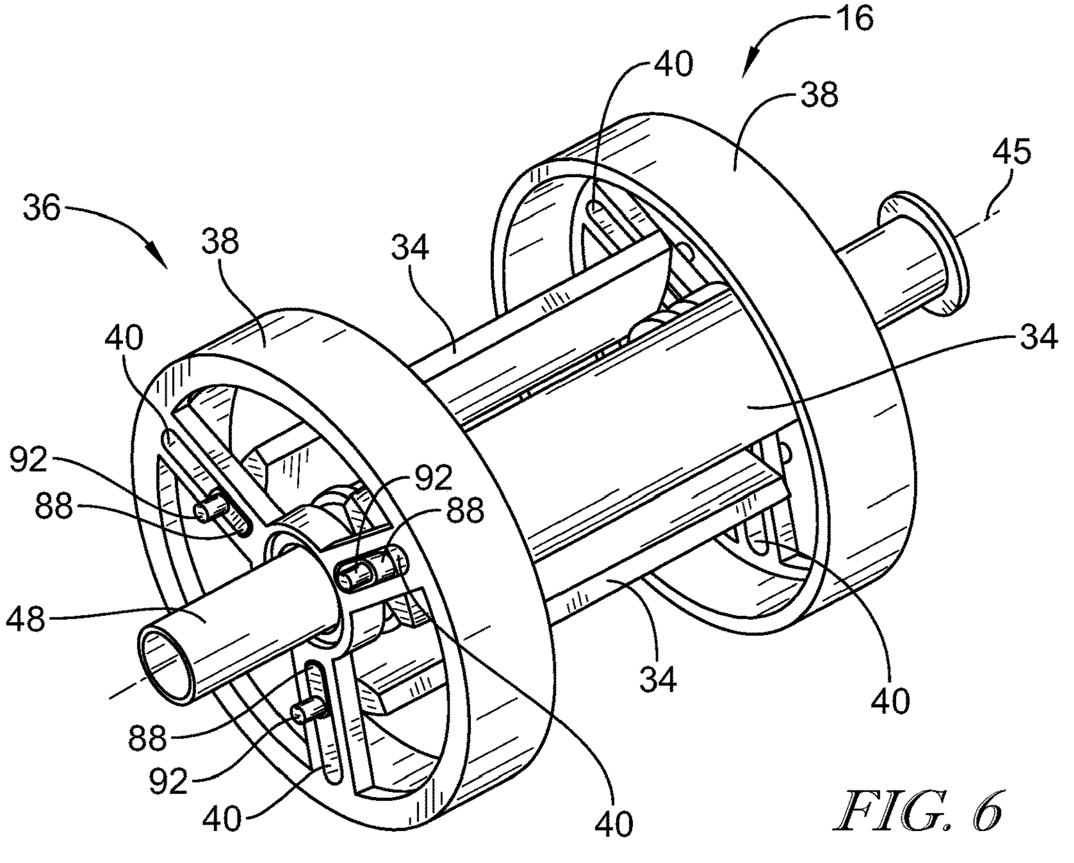
FIG. 6 is a perspective view of internal portions of the pump of FIGS. 1-5, similar to FIG. 5, having an outer covering removed and omitting the bladder to reveal internals, and showing the plungers are arranged reciprocated to a radially inward position, corresponding with their position in FIG. 4, and omitting certain structural supports.

Referring now to FIGS. 5 and 6, the track assembly 36 includes a pair of frame portions 38 defining tracks 40 for guiding motion of the plunger assembly 32. The frame portions 38 are illustratively spaced apart from each other. Each frame portion 38 is arranged with one of the tracks 40 engaged with each one of the plungers 34 to provide guidance for radial movement.

In the illustrative embodiment, each frame portion 38 defines three tracks 40 arranged with circumferential spacing of about 120 degrees from each other, with each track 40 arranged in corresponding angular (circumferential) position with a corresponding one of the three tracks 40 of the other frame portion 38 such that pairs of tracks 40 of each frame portion 38 are arranged at the same angular (circumferential) position about the axis 45. Referring to FIG. 5, the frame portions 38 are each shown to include a foot 42 for mounting to a base frame 44 of the HFCWO pump 16. The base frame 44 illustratively includes structural member 46, embodied as a plate, for supporting a driveshaft 48 for rotational motion about the rotational axis 45, as discussed in additional detail herein.

In FIG. 5, the plungers 32 are shown arranged in the radially outward position, similar to FIG. 3, with the bladder 28 omitted for description ease. In FIG. 6, the plungers 32 are shown in the radially inward position, similar to FIG. 4, with the bladder 28 omitted for description ease. Each plunger 32 remains engaged with the corresponding tracks 40 the frame portions 38 throughout the extent of their reciprocating radial movement.

Figure 7:
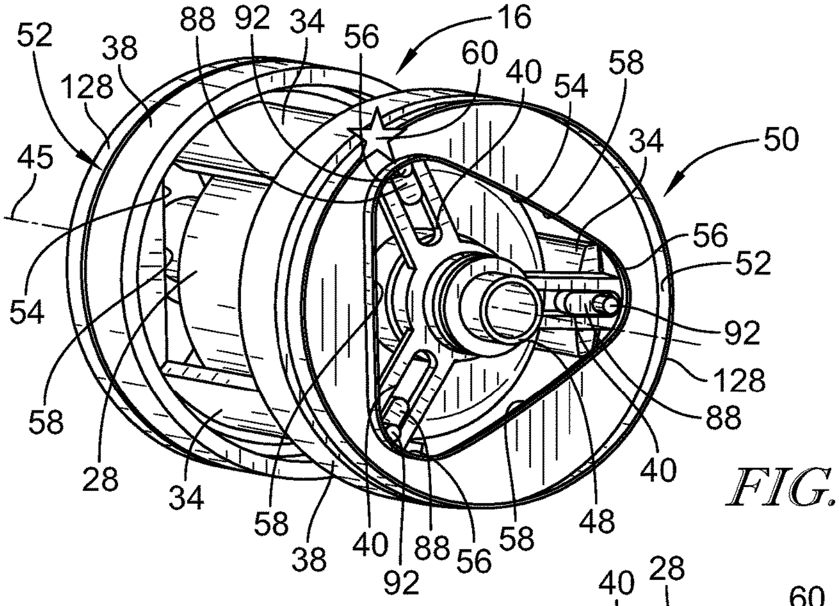
FIG. 7 is a perspective view of internal portions of the pump of FIGS. 1-6, showing that the drive assembly includes a pair of cams (nearer cam shown rendered partly transparent for clarity) coupled with the drive shaft to receive rotational drive, and showing that the cams are each engaged with the plunger assembly to translate rotational force of the drive shaft into reciprocal motion of the plungers, and showing that the cam comprises a triangular cam surface engaged with each of the plungers and presently positioned such that the cam surface is engaged with each of the plungers at a respective apex of the cam surface, and showing a marker (star) to identify one apex of one of the cams for visual reference.
Figure 8:
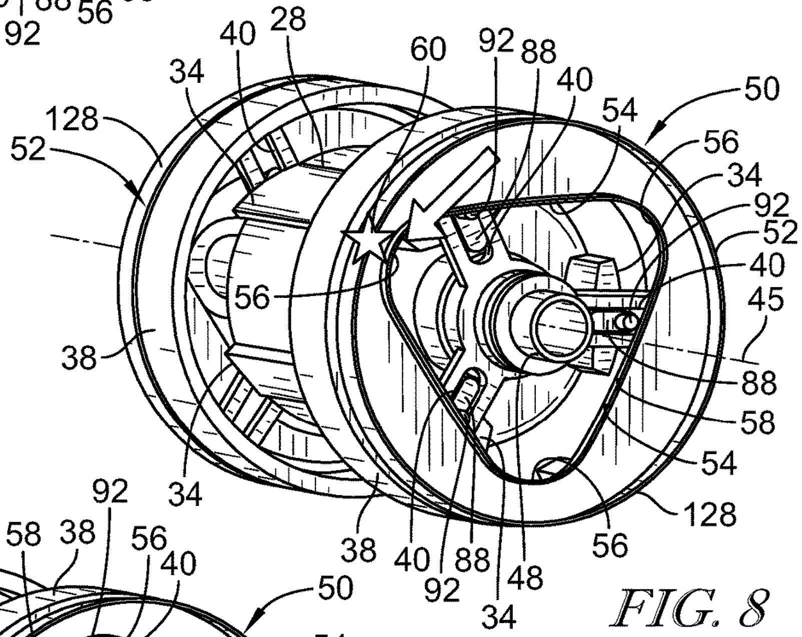
FIG. 8 is a perspective view of internal portions of the pump of FIGS. 1-7, similar to FIG. 7, showing that the cams have been rotated under power of the drive shaft as indicated according to the marker (star) moved counterclockwise relative to FIG. 7 such that the plungers are each arranged at an intermediate position between radially inward and outward positions.
Figure 9:
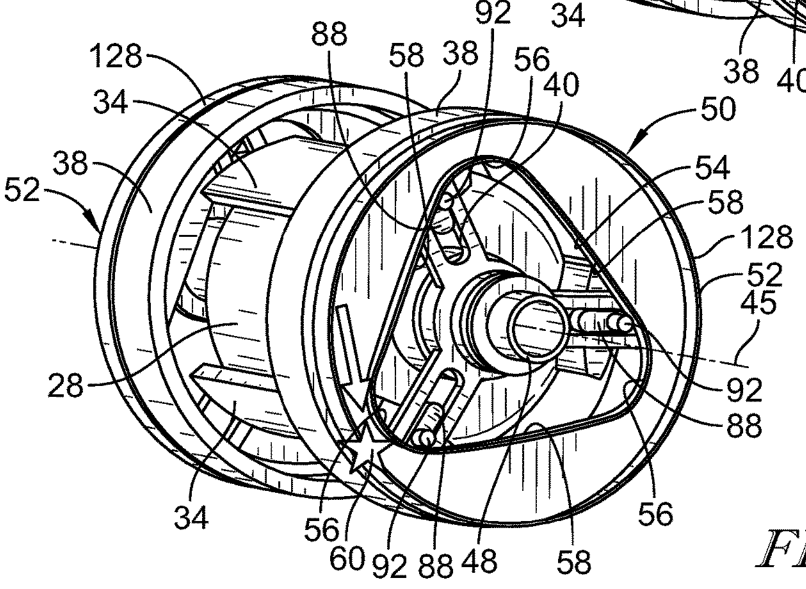
FIG. 9 is a perspective view of internal portions of the pump of FIGS. 1-8, similar to FIGS. 7 and 8, showing that the cams have been rotated under power of the drive shaft as indicated according to the marker (star) moved counterclockwise relative to FIGS. 7 and 8 such that the plungers are each arranged at another intermediate position between radially inward and outward positions, just before engaging with the successive apex to reassume the radially outward position.

Referring now to FIGS. 7-9, the HFCWO pump 16 includes a drive assembly 50 for providing drive force to the plunger assembly 32. The drive assembly 50 includes the driveshaft 48 and a pair of cams 52 coupled with the driveshaft 48 to receive rotational drive from the driveshaft 48. The cams 52 are each illustratively embodied as a drive plate 128 extending radially and coaxially from connection with the driveshaft 48.

Each cam 52 is illustratively engaged with the plunger assembly 32 to transfer rotational motion of the drive shaft 48 into radial drive of the plungers 34. The cams 52 each defining a cam surface 54 engaged with the plungers 34 to radially drive the plungers 34 according to the circumferential profile of the cam surface 54.

Referring to FIG. 7, the (right most) cam 52 has been rendered transparent to reveal the cam surface 54 embodied to have a triangular circumferential profile. Each cam surface 54 is formed as a continuous, radially inward facing surface, having peaks 56 and connecting portions 58 in alternating succession. The peaks 56 and connecting portions 58 are each arranged corresponding respectively with the radially outward and radially inward positions of the plungers 34. The peaks 56 are illustratively arranged spaced apart from each other by the connecting portions 58 at equal circumferential positions about the rotational axis 45 providing.

The size and shape of the cams surfaces 54 of each cam 52 are illustratively equal and mirror images of each other. The peaks 56 of each cam 52 are arranged with equal angular (and radial) position as the peaks 56 of the other cam 52 such that longitudinal ends of the plungers 34 engaged with each cam surface 54 are driven to equal radial distance from the axis 45 for each angular position of the cams 52 via driveshaft 48. The connecting portions 58 of each cam 52 are arranged with equal angular (and radial) position as connecting portions 58 of the other cam 52.

As shown in FIG. 7, the plungers 32 are presently arranged to engage the cam surfaces 54 near each corresponding peak 56 such that the plungers 34 are each arranged in the radially outward position permitting the bladder 28 to have the expanded position. A reference star 60 is shown near one of the peaks 56 to visually identify a reference angular point of the cams 52 throughout the FIGS. 7-9.

Proceeding to FIG. 8, the drive assembly 50 has been rotated counterclockwise (in the orientation as shown in FIGS. 7-9) relative to the position in FIG. 7, as observable based on comparison of the relative location of the reference star 60. Each of the plungers 34 are no longer presently arranged to engage with the peaks 56 of the cam surface 54, but are instead engaged with the connecting portions 58 at an intermediate location between adjacent peaks 56. The plungers 34 are each presently arranged at an intermediate radial position (between the radially outward and inward positions) corresponding with their present state of engagement with the cam surface 54.

Proceeding to FIG. 9, the drive assembly 50 has been rotated further counterclockwise (in the orientation as shown in FIGS. 7-9) relative to the position in FIG. 8, as observable based on comparison of the relative location of the reference star 60. Each of the plungers 34 are presently arranged to engage with the connecting portion 58 of the cam surface 54 just a few degrees before engagement with the peaks 56, and are thus engaged with the connecting portions 58 at an intermediate location between adjacent peaks 56 but closer to the next peak 56 than the intermediate location in FIG. 8. The plungers 34 are each presently arranged at an intermediate radial position (between the radially outward and inward positions) corresponding with their present state of engagement with the cam surface 54, and having slightly greater radial distance from the axis 45 than shown in FIG. 8, but not quite as large as the radial distance of the radially outward position of FIG. 7 that corresponds with engagement of the plungers 34 with the peaks 56.

At a middle angular position of the drive assembly 50 between that shown in FIGS. 7 and 8, the plungers 34 would be arranged to engage the cam surface to have the radially inward position having the shortest radial distance from the axis 45. Accordingly, the plungers 34 are driven radially inward from the radially outward position until the middle angular position of the drive assembly 50. After rotation of the drive assembly 50 moves beyond the middle angular position, the plungers 34 are each permitted by their engagement with the cam surface 54 to move radially outward towards the radially outward position. From the angular position of the drive assembly 50 in FIG. 9, continued counterclockwise rotation of the drive assembly 50 (in the orientation as shown in FIGS. 7-9) would resume a similar position as in FIG. 7, with each plunger 34 then being engaged by the proceeding peak 56 of the cam surface 54, and then continuing to repeat positioning as shown in FIGS. 8 and 9.

Figure 10:
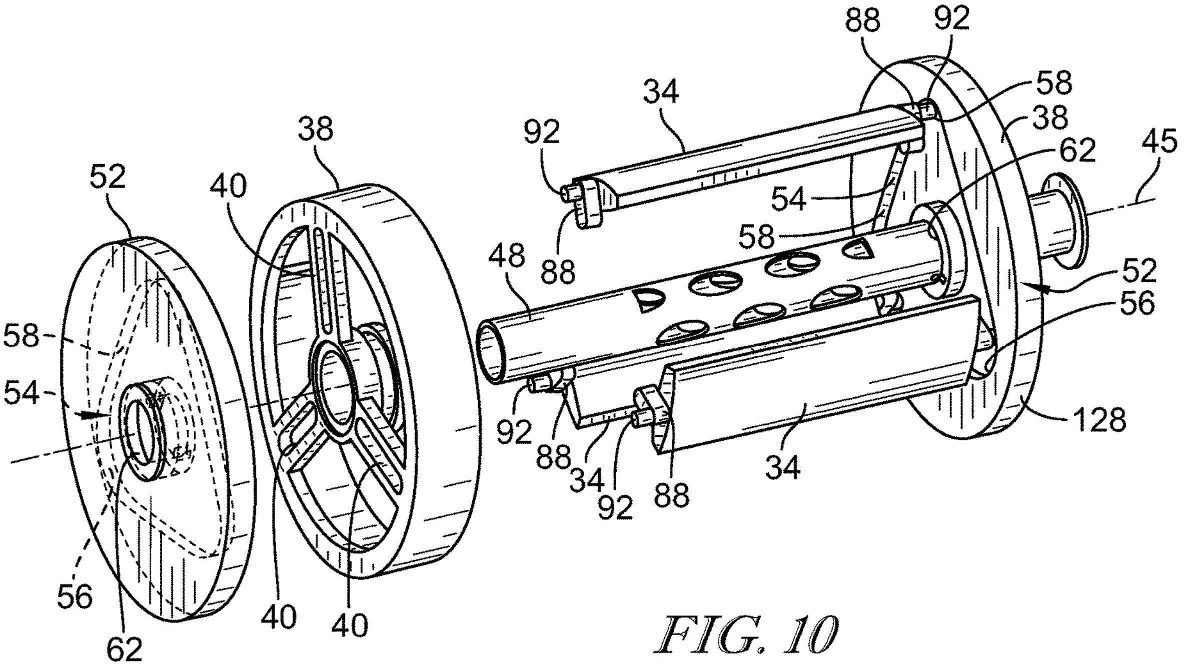
FIG. 10 is an exploded perspective view of internal portions of the pump of FIGS. 1-9 showing a frame portion of a track assembly for guiding reciprocating motion of the plungers, and omitting another frame portion of the track assembly for ease of illustrating engagement of the plungers with one of the cams, and showing that the drive shaft includes a number of openings for arrangement within the bladder to communicate pressurized air with the pressure cavity.

Referring now to FIG. 10, portions of the HFCWO pump 16 are shown in exploded arrangement for descriptive ease. One of the frame portions 38 (the right most frame portion in the orientation of FIG. 10) has been omitted to show that the plungers 34 are each engaged with the cam surface 54 of one the cams 52 (the right most cam 52 in the orientation of FIG. 10), and particularly at the peaks 56 such that the plungers 34 are each arranged at the radially outward position. The cams 52 each include a central opening 62 for receiving the driveshaft 48 for rotationally fixed coupling to receive drive rotation about the axis 45.

Figure 11:
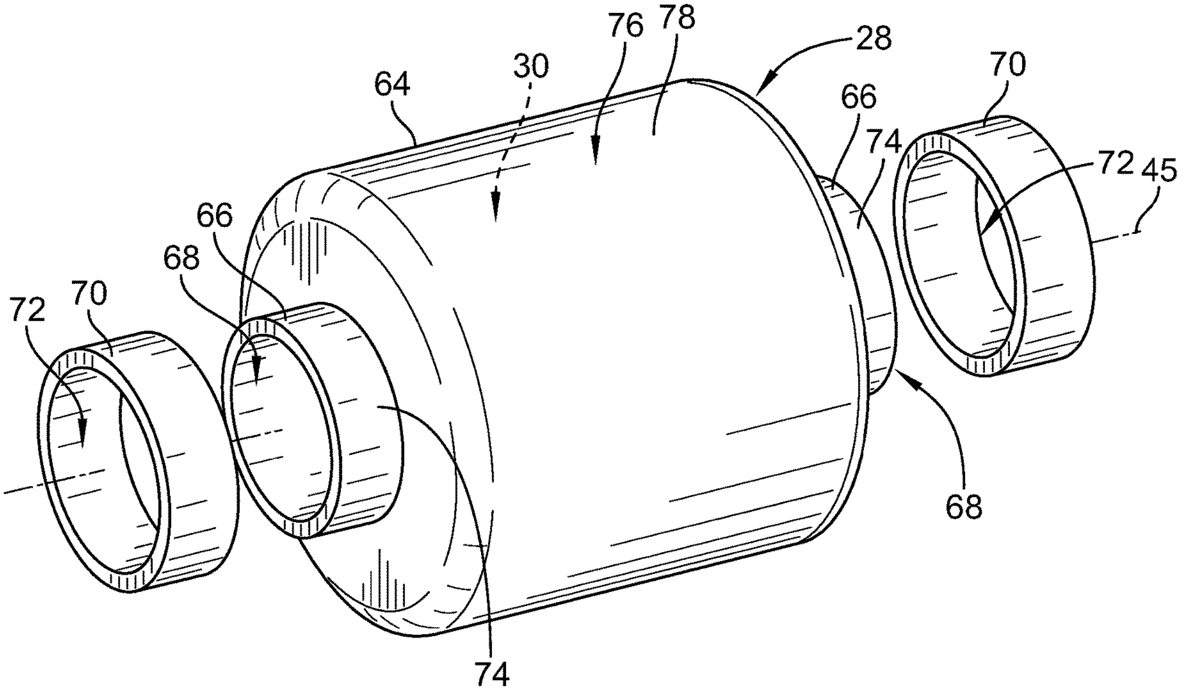
FIG. 11 is a perspective view of the bladder of the pump of FIGS. 1-10 showing that the bladder includes a wall defining the pressure cavity, and an outer surface for engagement with the plungers to move the wall to oscillate the volume of the pressure cavity, and longitudinal ends for coupling with cuffs to seal the pressure cavity.

Referring now to FIG. 11, the bladder 28 is shown apart from other portions of the HFCWO pump 16. The bladder 28 is illustratively formed to have cylindrical base 64 extending coaxially along the axis 45. The base 64 includes a bladder wall 76 having an exterior surface 78 for engagement with the plungers 34. The bladder wall 76 is illustratively formed of a resilient, stretchable material, such as rubber, allowing for resilient compression of the base 64 under the force of the plungers 34 to drive the pressure cavity 30 to the contracted position. In some embodiments, the bladder wall 76 may be formed of a resilient, inflexible material.

The bladder 28 includes a collar 66 extending longitudinally outward from each longitudinal end of the base 64. The collar 66 is illustratively formed as a portion of the bladder wall 76 from the same resilient material, although in some embodiments, may be formed distinctly from the bladder wall 76 forming the base 64. The collars 66 are each configured to engage with one of the frame portions 38 of the track assembly 36.

Each collar 66 is formed as an annular wall defining an opening 68 therethrough arranged in communication with the pressure cavity 30. The openings 68 are illustratively arranged to receive extension of the driveshaft 48 therethrough such that the driveshaft 48 extends through the pressure cavity 30. The bladder 28 includes a cuff 70 for each collar 66 formed as an annular member defining an opening 72 for receiving the corresponding collar 68. The cuffs 70 are adapted for enveloping the corresponding collars 66 to apply radially inward pressure against an outer surface 74 of the collars 68 to seal the collars 68 with the frame portions 38.

Figure 12:
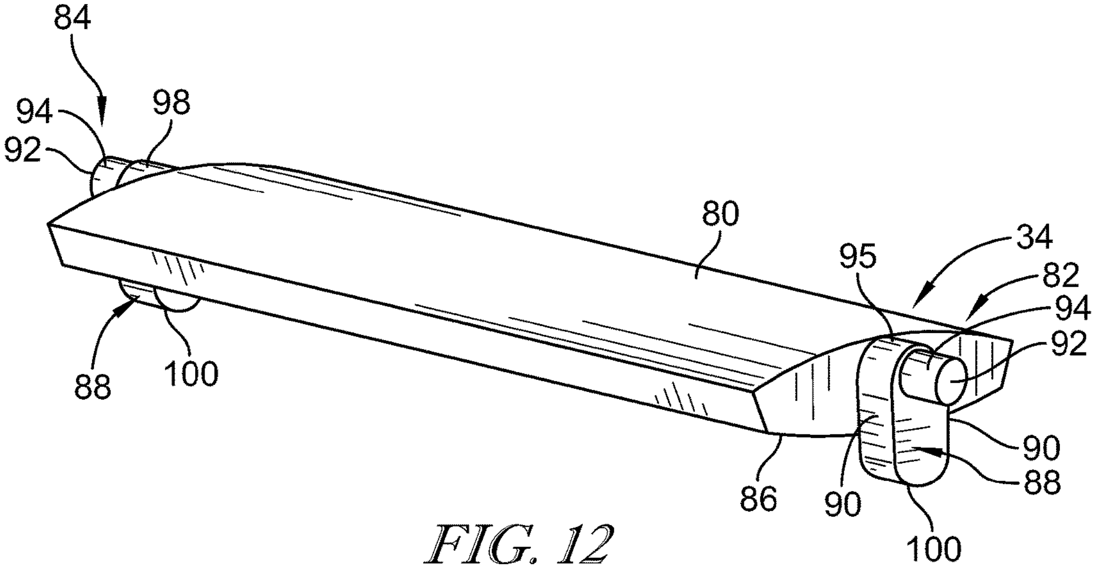
FIG. 12 is a perspective view of a plunger of the plunger assembly of the pump of FIGS. 1-11 showing that each plunger includes a track follower and a cam follower at each end.
Figure 13:
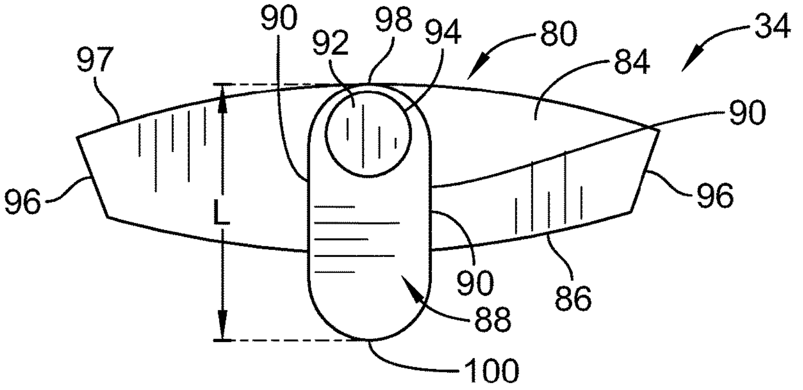
FIG. 13 is an elevation view of a longitudinal end of the plunger of FIG. 12.
Figure 14:
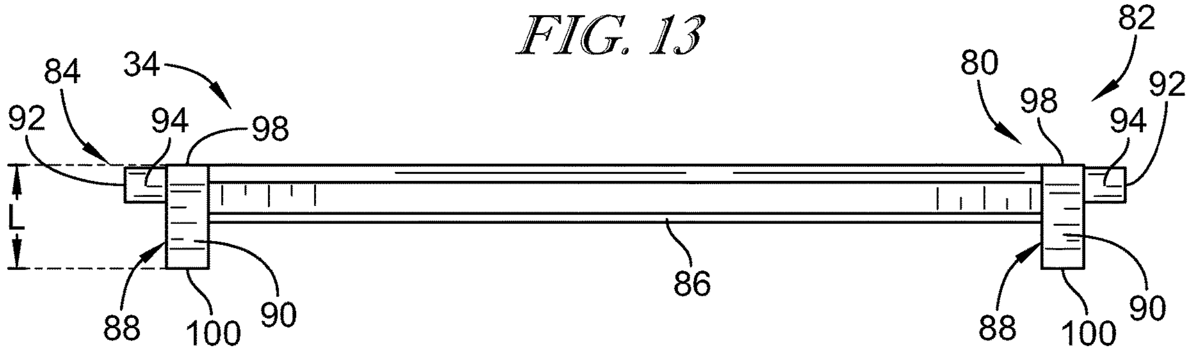
FIG. 14 is an elevation view of a side of the plunger of FIGS. 12 and 13.

Referring now to FIGS. 12-14, each plunger 34 is formed to have an elongated body 80 extending longitudinally between ends 82, 84. The body 80 includes an engagement surface 86 for engagement with the bladder 28. The engagement surface 86 is defined on an inner side thereof extending between the ends 82, 84.

Each plunger 34 includes a track follower 88 at each longitudinal end 82, 84 of the body 80 for engagement with the corresponding track 40 of the track assembly 36. Each track follower 88 is illustratively formed as an elongated circular cross-section having elongated cross-sectional length L. The elongated cross-section of each track follower 88 is projected longitudinally out from the body 80 to define opposing lateral sides 90. The sides 90 of each track follower 88 are illustratively formed to extend radially and parallel to each other for engaging the corresponding track 40 to receive guidance for the respective plunger 34 for radial movement relative to the axis 45.

Each plunger 34 includes a cam follower 92 for engagement with the corresponding cam 52. Each cam follower 92 is illustratively formed as a cylindrical projection extending longitudinally out from the respective end 82, 84 of the body 80, more specifically, connected with a longitudinally outer side of the corresponding track follower 88 and projecting longitudinally outward therefrom. Each cam follower 92 defines an exterior surface 94 for engagement with the cam surface 54 of the corresponding cam 52 to transfer rotational force of the driveshaft 48 into radial motion of the plungers 34.

Each cam follower 92 illustratively forms a plain bearing with the corresponding cam surface 54. In some embodiments, the cam followers 92 may include any suitable manner of bearing for engagement with the corresponding cam surface 54 to transfer rotational force of the driveshaft 48 to radial movement of the plunger 34, for example, a roller bearing, fluid bearing, and/or magnetic bearing.

Referring to FIG. 13, the engagement surface 86 of each plunger 34 is illustratively formed to have convex curvature along the lateral direction (orthogonal to the longitudinal direction) for engagement with the bladder 28. Each plunger 34 defines lateral sides 96. The lateral sides 96 are illustratively slanted to taper outwardly to an exterior (radially outer) side 97.

Each track follower 88 extends radially (vertically in the orientation in FIG. 13). Each track follower 88 defines an upper end 98 at which the exterior surface 98 is arranged even with the exterior side 97 of the body 80, and a lower end 100 extending (radially inward) beyond the engagement surface 86 and defining the length L therebetween. In the illustrative embodiment, each track follower 88 and each body 80 are formed symmetrically about the longitudinal plane (symmetrical about the vertical direction in FIG. 13).

Referring briefly to FIG. 14, each plunger 34 is illustratively formed symmetrically along the axial direction relative to axis 45 (symmetrical about the vertical direction in FIG. 14). In the illustrative embodiment, the plungers 34 are formed separately from the bladder 28, but in some embodiments, one or more plungers 34 may be formed partly or wholly integrated and/or connected with the bladder 28, for example, by integral formation with the bladder wall 76.

Figure 15:
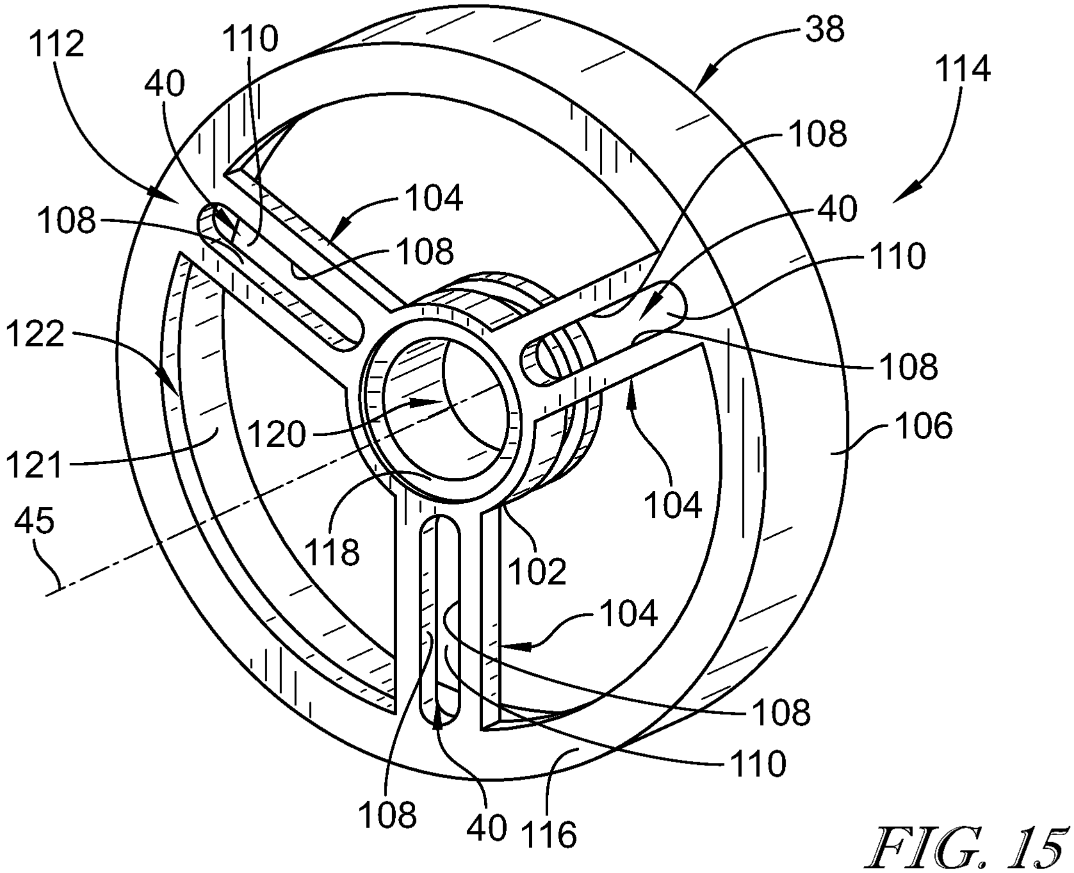
FIG. 15 is a perspective view of the frame portion of the track assembly of the pump of FIGS. 1-11 showing that the frame portion defines tracks for guiding reciprocating motion of the plungers.

Referring now to FIG. 15, each frame portion 38 of the track assembly 36 illustratively includes three tracks 40 arranged with equal circumferential spacing from each other about axis 45. Each frame portion 38 includes a hub 102 formed concentrically with axis 45 and defining a shaft opening 120 for receiving the driveshaft 48. Each frame portion 38 includes track struts 104 extending radially from the hub 102 for connection with an outer annulus 106.

The track struts 104 each define one of the tracks 40 therein for receiving sliding engagement of the track followers 88. The tracks 40 are each formed to include a receiver space 110 defined in the track struts 104 between radially extending sides 108. The receiver space 110 illustratively receives the corresponding track follower 88 therein such that the sides 90 of the track follower 88 are slidingly engaged within the sides 108 of the track struts 104 to guide radial motion of the respective plunger 34. Each receiver space 110 defines a radial length sufficient to allow travel of the track follower 88 corresponding with movement of the respective plunger 34 between the radially outward and radially inward positions.

Still referring to FIG. 15, each frame portion 38 includes an exterior side 112 for arrangement facing away from the bladder 28, and an interior side 114 for arrangement facing towards the bladder 28. The track struts 104 each connect with an outer circumference of the corresponding hub 102 near the exterior side 112 and extend for connection with an inner circumference 123 of the outer annulus 106 near the exterior side 112. In the illustrative embodiment, the track struts 104 each extend flush with the hub 102 and outer annulus 106 on the exterior side 112 to form a uniformly flat exterior face 116.

The hub 102 is illustratively formed as an annular member having a bushing 118 defined concentrically about the axis 45. The bushing 118 defines the shaft opening 120 therethrough for receiving the driveshaft 48 extending therethrough in rotational engagement to provide a rotational bearing. The bushing 118 is illustratively embodied to form a slide bearing with the driveshaft 48, but in some embodiments, may form a roller bearing, fluid bearing, magnetic bearing, and/or any other suitable bearing for rotationally supporting the driveshaft 48.

Figure 16:
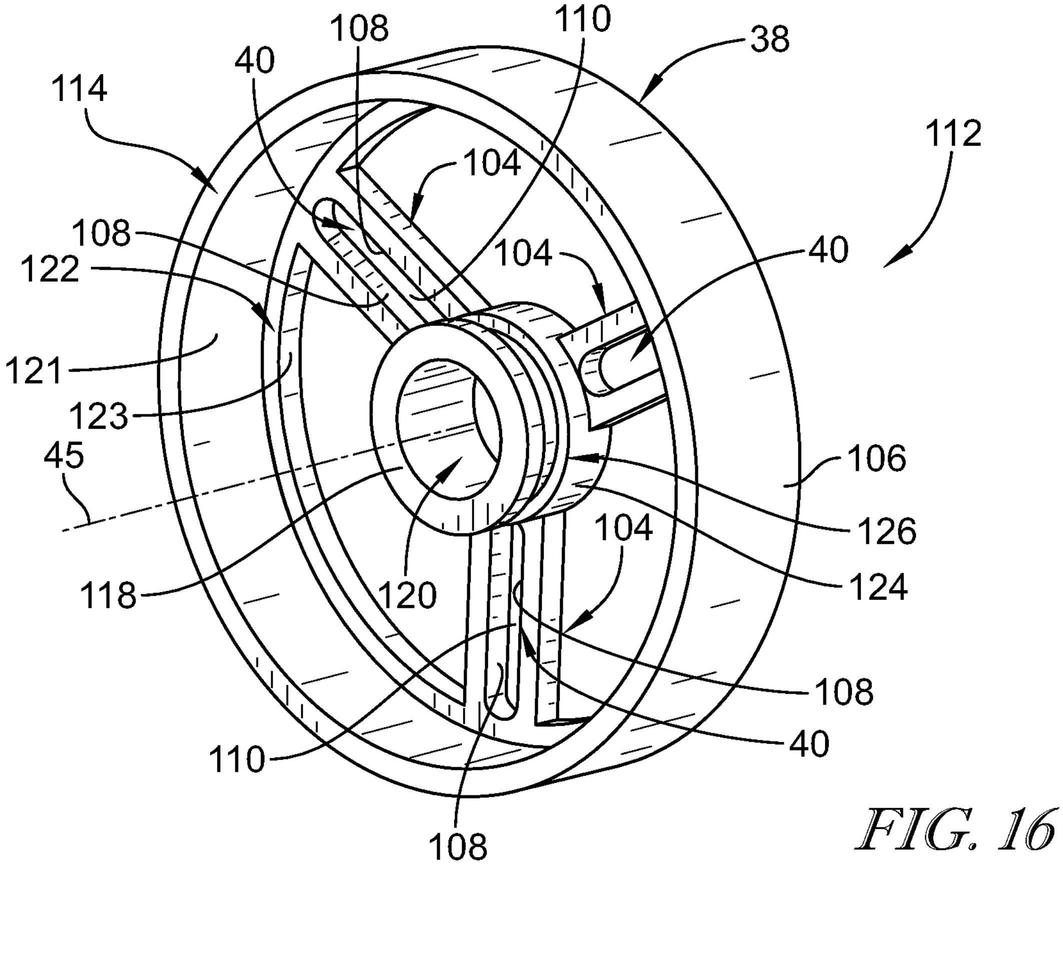
FIG. 16 is a perspective view of the frame portion of FIG. 15 from an opposite direction, showing that the frame portion includes a cylindrical surface for receiving connection with the bladder.

Referring now to FIG. 16, the outer annulus 106 may include a ledge 122 projecting radially inward from an inner circumference 121 of the outer annulus 106 to define an inner circumference 123 for connection with each of the track struts 104. The ledge 122 is illustratively arranged at the exterior side 112 and forms a portion of the exterior face 116.

Each hub 102 is adapted for sealing connection with the bladder 28. Each hub 102 includes a cylindrical outer surface 124 extending axially along the axis 45 such that each hub 102 can be inserted into one of the collars 66 of the bladder 28 to seal against the annular interior surface of the collar 66 under compression by the corresponding cuff 70. The cylindrical outer surface 124 includes an annular depression 126 therein that extends circumferentially about the hub 102.

Figure 17:
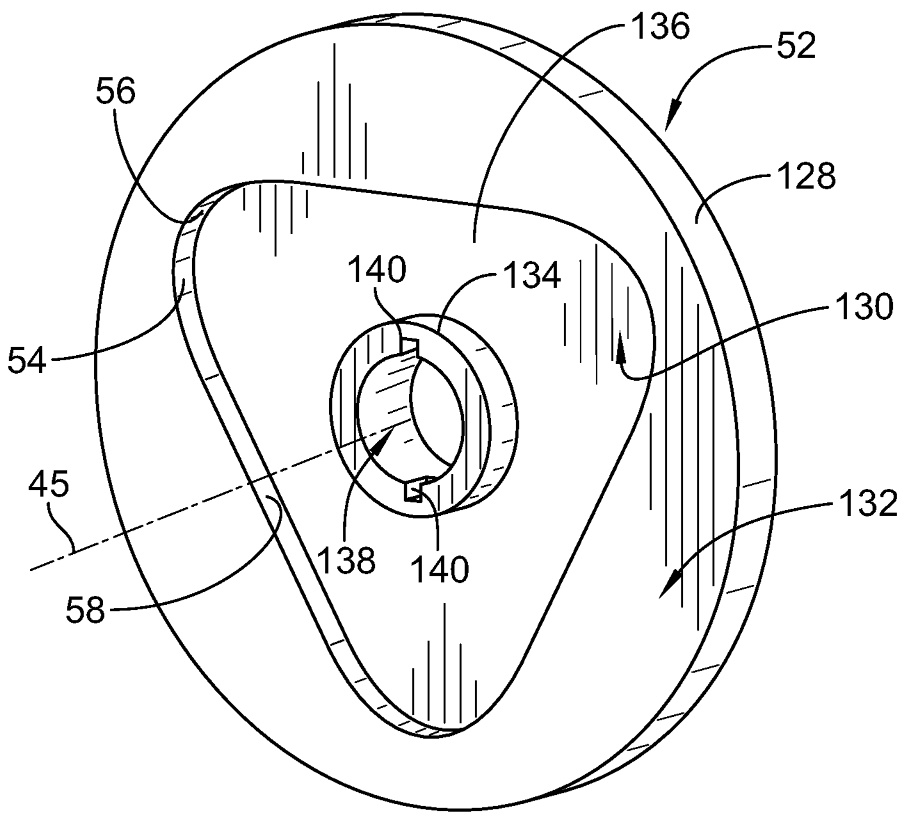
FIG. 17 is a perspective view of a cam of the drive assembly of the pump of FIGS. 1-11 showing that the cam includes a cam plate defining a cam surface for transferring rotational drive of the drive shaft into linear motion of the plungers.

Referring now to FIG. 17, each cam 52 illustratively includes the drive plate 128 and the cam surface 54 formed as a radially inward facing surface formed by a depression 130 in an interior side 132 of the drive plate 128. Each cam 52 includes a hub 134 concentrically arranged relative to the axis 45. Each hub 134 extends axially from a lateral surface 136 of the drive plate 128 defining the depression 130.

Each hub 134 is formed to define a shaft opening 138 for receiving the driveshaft 48 for fixed rotation between the cam 52 and the driveshaft 48 about axis 45. Each hub 134 is embodied to include a pair of key receivers 140 embodied as recesses formed on an interior circumference of the hub 134 connecting with the shaft opening 138 to receive fixed keys for rotational connection with the driveshaft 48 about the axis 45. In some embodiments, rotational connection between the cam 52 and driveshaft 48 for rotation about axis 45 may include welding, interference fit, threading, and/or any other suitable manner of rotational connection for rotating the cams 52 about the axis 45 under power of the driveshaft 48.

Figure 18:
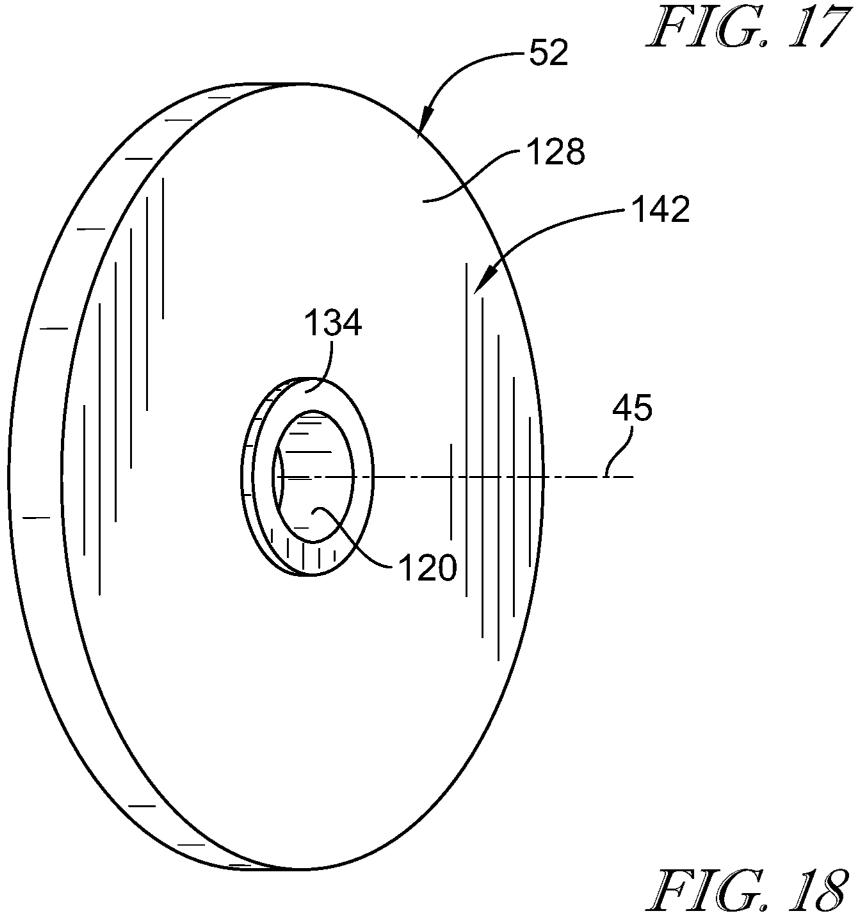
FIG. 18 is a perspective view of the cam of FIG. 17 from an opposite direction.

As shown in FIG. 18, each drive plate 128 includes an exterior side 142. The hub 134 illustratively projects axially beyond a surface of the exterior side 142. The shaft opening 138 illustratively penetrates through the hub 134 to allow the driveshaft 48 to extend therethrough.

Figure 19:
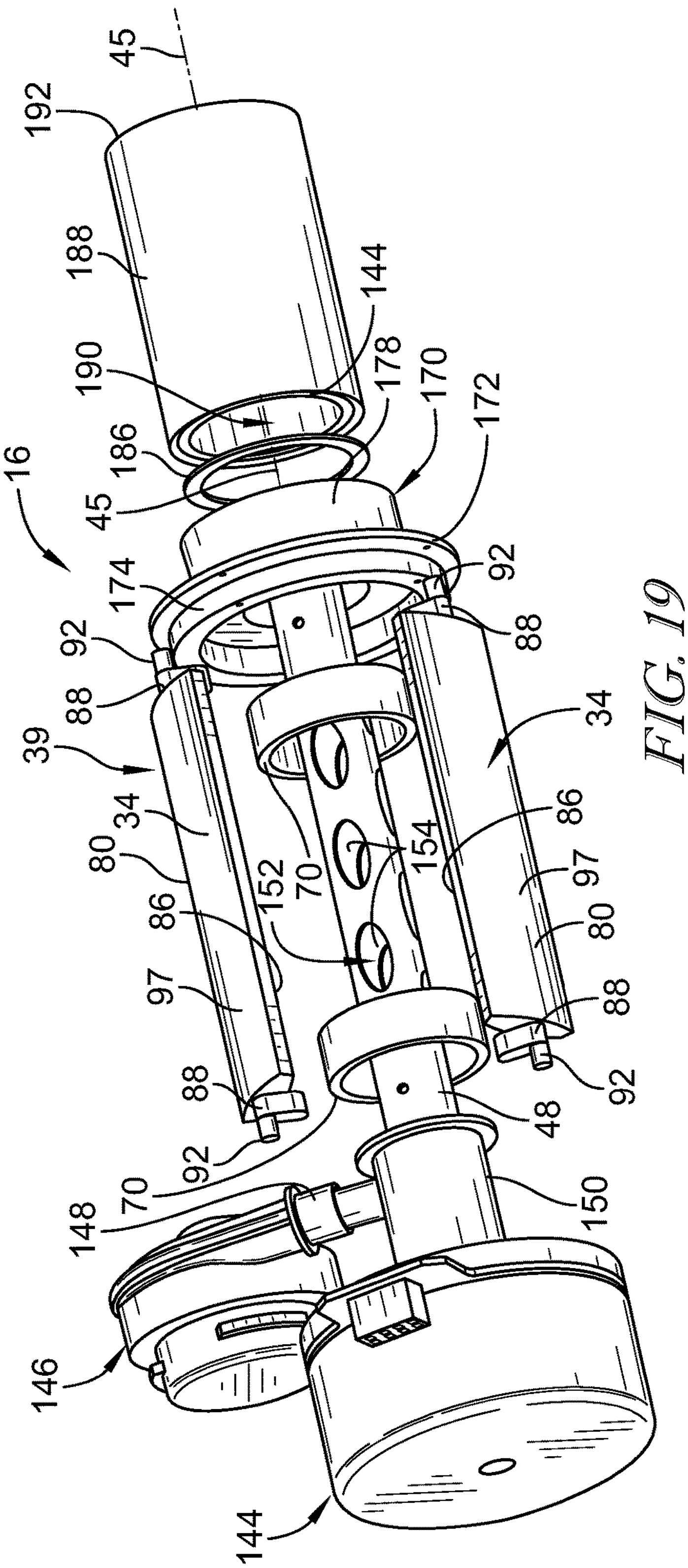
FIG. 19 is a perspective view of the pump of FIGS. 1-11 omitting the frame portions, bladder, and cams to illustrate portions of the drive assembly, such as the drive motor and drive shaft, and pressure components such at the pressurizer.

Referring now to FIG. 19, portions of the HFCWO pump 16 are shown omitting certain other portions, such as the frame portions 38 and bladder 28, for descriptive ease. A rotational drive motor 144 is illustratively connected with the driveshaft 48 to provide rotational drive about axis 45. The drive motor 144 is illustratively positioned on one longitudinal end of the HFCWO pump 16 connected with an axial end of the driveshaft 48 (the connection being formed within pressure housing 150 as discussed in additional detail herein).

The HFCWO pump 16 includes a pressurizer 146 for providing baseline fluid pressure to the bladder 28. The pressurizer 146 is illustratively embodied as a fluid pump arranged in fluid communication with the bladder 28. The pressurizer 146 includes a fluid outlet 148 for providing pressurized fluid. The fluid outlet 148 is connected with a pressure housing 150 to communicate pressurized fluid from the pressurizer 146 to the bladder 28. The driveshaft 48 extends into the pressure housing 150 to receive pressurized fluid therefrom for communication to the bladder 28. In the illustrative embodiment, the pressure housing 150 forms a fluid tight seal against the hub 143 of the cam 52.

Figure 20:
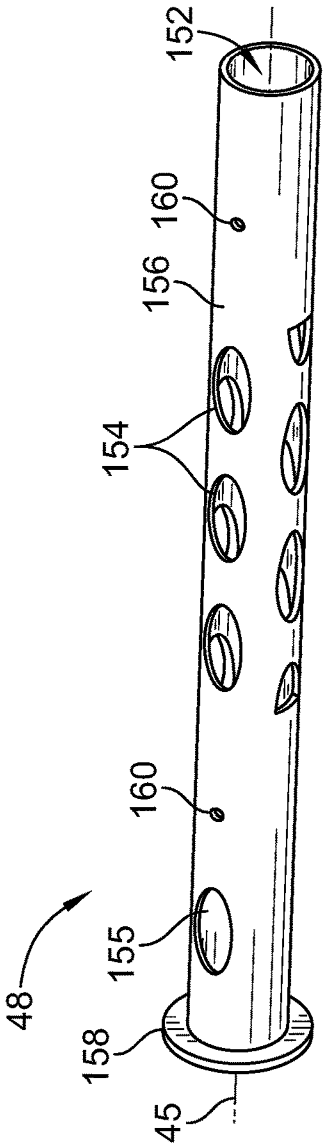
FIG. 20 is a perspective view of the drive shaft of FIG. 19 showing that the drive shaft is formed as a hollow shaft having openings for communication of pressurized fluid with the pressure cavity.

Referring now to FIG. 20, the driveshaft 48 extends axially along the axis 45 between axial ends. The driveshaft 48 is illustratively formed as a hollow shaft defining a flow passage 152 therethrough. The driveshaft 48 includes bladder openings 154 defined radially through a shaft wall 156 in communication with the flow passage 152. The driveshaft 48 includes a source opening 155 arranged in communication with the pressurizer 146 to receive pressurized fluid therefrom and in communication with the flow passage 152 to provide pressurized fluid to the pressure cavity 30 for baseline pressure.

The driveshaft 48 extends into the bladder 28 to arrange the bladder openings 154 within the pressure cavity 30 of the bladder 28 to communicate the flow passage 152 with the pressure cavity 30. The flow passage 152 provides baseline fluid pressure from the pressurizer 146 and flow communication with the therapy vest 14. The driveshaft 48 includes a flange 158 on one end for connection with the drive motor 144. The driveshaft 48 includes key holes 160 formed as recesses defined in the shaft wall 156 to receive fixed keys for rotational connection with the driveshaft 48 about the axis 45.

Figure 21:
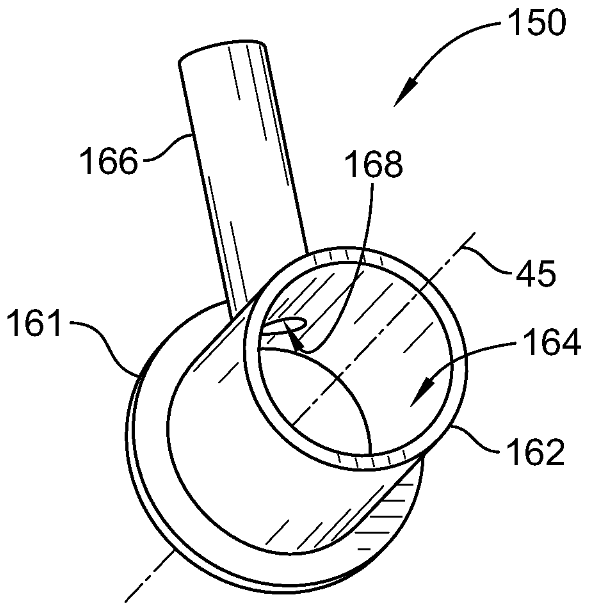
FIG. 21 is a perspective view of a pressure housing of the pump of FIGS. 1-11 and 19 connected with the pressurizer to communicate pressurized fluid with the pressure cavity of the bladder.

Referring now to FIG. 21, the pressure housing 150 includes a cylindrical body 162 extending axially along the axis 46 and defining a flow passage 164 therein. The pressure housing 150 includes an inlet stem 166 extending radially from connection with the body 162 for connection with the fluid outlet 148 of the pressurizer 146. The inlet stem 166 includes an inlet passage 168 defined therethrough in communication with both of the fluid outlet 148 and the flow passage 164 for communicating pressurized fluid from the pressurizer 146 to the bladder 28. The pressure housing 150 includes a flange 161 for engagement with the cam 52.

Figure 22:
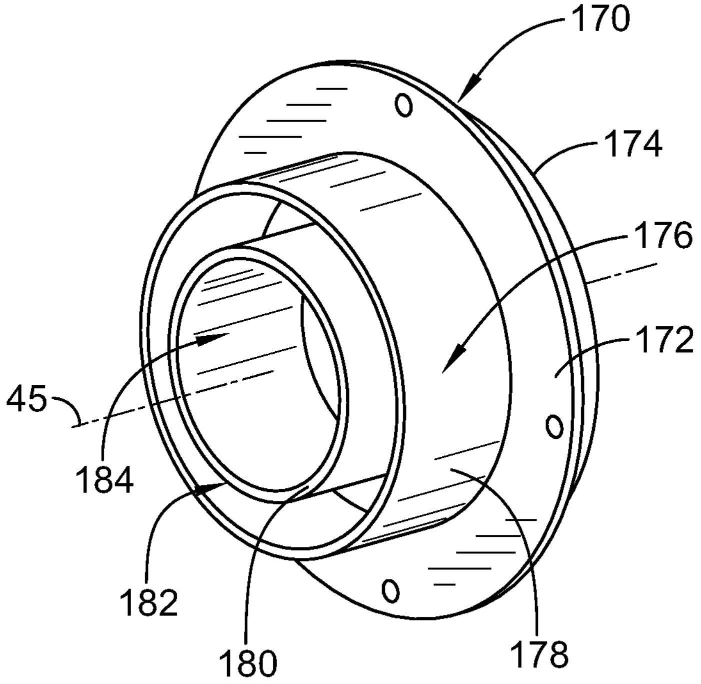
FIG. 22 is a perspective view of an outlet cap of the pump of FIGS. 1-11 and 19 for connection with a hose to communicate pressurized fluid with therapy garment of FIG. 1.

Referring to FIG. 22, the HFCWO pump 16 includes an outlet cap 170. The outlet cap 170 is illustratively arranged to abut the corresponding cam 54 on an end of the HFCWO pump 16 opposite to the drive motor 144. The outlet cap 170 includes a cap plate 172 having an annular cap wall 174 extending concentrically from the cap plate 172 towards the cam 54 for engagement therewith. The outlet cap 170 includes an annular exit 176 extending concentrically from the cap plate 172 opposite the cap wall 174. The annular exit 176 includes inner 180 and outer 178 annular walls spaced radially apart from each other to define a receiving gap 182. The inner annular wall 180 defines a shaft passage 184 penetrating through the outlet cap 170 to receive the drive shaft 48 extending therethrough.

The outlet cap 170 includes an o-ring 186 (as shown in FIG. 19) and outlet stem 188 each arranged to be received within the receiving gap 182 (as shown in FIG. 22) 143. The outlet stem 188 defines a flow passage 190 for communication of the shaft flow passage 152 with an outlet 192 defined on an outward end of the outlet stem 188 for connection with the fluid hose 18. The o-ring 186 is arranged to abut an inner face wall of the outlet cap 170 within the receiving gap 182 and an annular face 194 of the outlet stem 188 for fluid tight connection.

Figure 23:
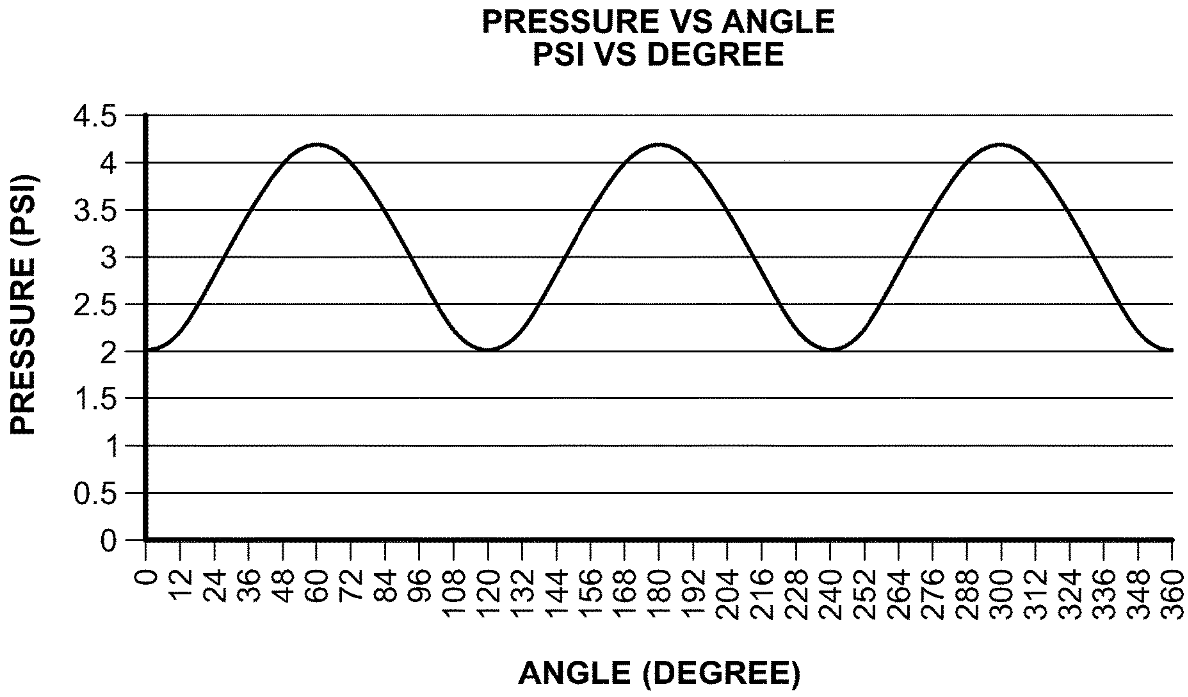
FIG. 23 is a graphical depiction of bladder pressure vs. rotational angle of the drive shaft of the pump of FIGS. 1-11 and 19 showing three pressurization periods within about 360 degrees of rotation.
Figure 24:
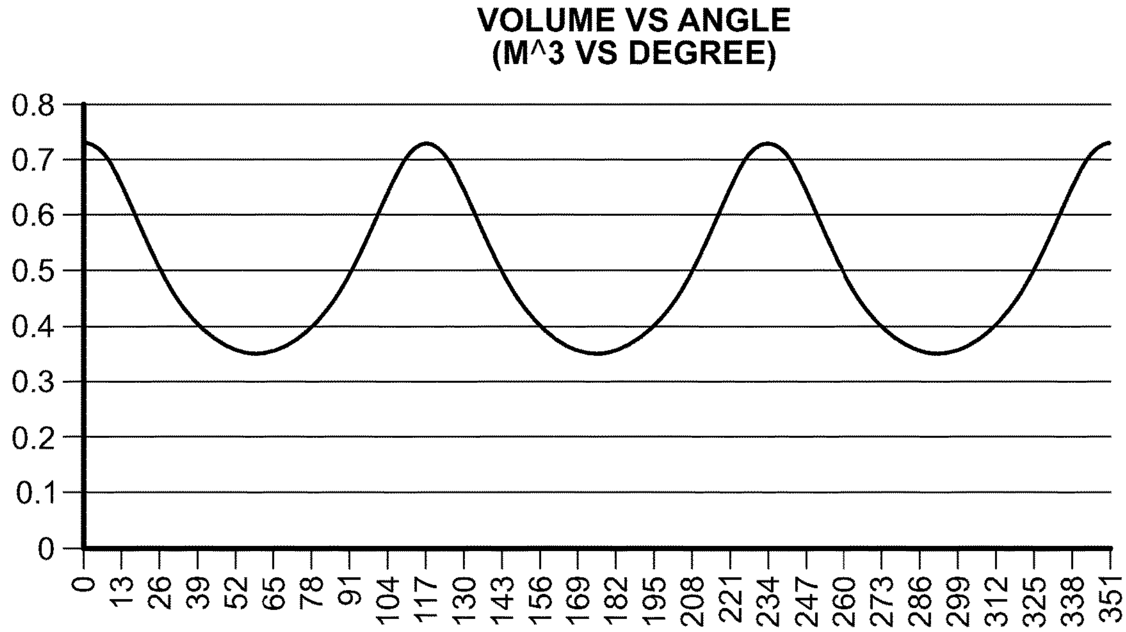
FIG. 24 is a graphical depiction of bladder volume vs. rotational angle of the drive shaft of the pump of FIGS. 1-11 and 19 showing four volume peaks within about 360 degrees of rotation.

Referring to FIGS. 23 and 24, the pressure and volume of the HFCWO pump 16 according to the angular position of the driveshaft 48, and therefore cams 54, is shown in graphical form. Each complete 360 degree rotation of the driveshaft 48 provides three complete pumping periods in which the plungers 34 are reciprocated through their radially inward and outward positions. Accordingly, a single pump period, including operating the bladder 28 through contraction and expansion positions, can occur within 120 degrees of driveshaft 48 rotation. In the illustrative embodiment, the baseline pressure is embodied to be about 2 psi and the maximum pressure of each fluid oscillation is about 4.2 psi, although in some embodiments, any suitable range of baseline and/or maximum pressures may be applied.

The volume of the pressure cavity 30 within bladder 28 reflects the pressure-angle operation, yet generates four pressure maximum instances within 360 degrees of rotation of the driveshaft 48. In the illustrative embodiment, the maximum volume of the pressure cavity 30 is embodied to be about 25 cubic feet (about 0.72 cubic meters) and the minimum volume of the pressure cavity 30 during each fluid oscillation is about 12.7 cubic feet (about 0.36 cubic meters). Although exemplary volumes and pressures have been illustrated, devices, systems, and methods within the present disclose may apply any suitable volumes and/or pressure.

Accordingly, devices, systems, and methods with the present disclosure can reduce losses of the HFCWO pump 16 providing greater efficiency in high frequency chest wall oscillation operation. For example, devices, systems, and methods with the present disclosure can require less revolution speed than traditional high frequency chest wall oscillation designs, reducing dissipative losses.

Although certain illustrative embodiments have been described in detail above, variations and modifications exist within the scope and spirit of this disclosure as described and as defined in the following claims.

We claim:

1. A high frequency chest wall oscillation pump, comprising:

a pressure cavity for fluid pressurization to provide pressure oscillation, the pressure cavity defined at least in part by at least one diaphragm arranged for movement between a first position and a second position, a squeeze assembly including a drive shaft arranged for rotational drive and at least one cam coupled with the drive shaft to receive rotational drive, and at least one squeeze body coupled with the at least one cam for radial reciprocating motion to squeeze the at least one diaphragm from one to the other of the first and second positions to generate fluid pressure within the pressure cavity, wherein the squeeze assembly is adapted for more than one oscillation of the at least one diaphragm between the first and second positions for each revolution of the drive shaft.

2. The high frequency chest wall oscillation pump of claim 1, wherein each of the at least one squeeze body is arranged radially outward of the at least one diaphragm.

3. The high frequency chest wall oscillation pump of claim 1, wherein the at least one squeeze body includes at least two squeeze bodies.

4. The high frequency chest wall oscillation pump of claim 3, wherein the at least two squeeze bodies are circumferentially spaced apart from each other.

5. The high frequency chest wall oscillation pump of claim 4, wherein each of the at least two squeeze bodies have equal circumferential spacing apart from each other.

6. The high frequency chest wall oscillation pump of claim 1, wherein each of the at least one cam is engaged with the at least one squeeze body for communicating rotational force of the drive shaft for movement of the at least one squeeze body.

7. The high frequency chest wall oscillation pump of claim 6, wherein each of the at least one cam includes a drive plate extending radially from the drive shaft and rotationally coupled with the drive shaft to receive rotational drive.

8. The high frequency chest wall oscillation pump of claim 7, wherein each drive plate includes at least one cam surface engaged with the at least one squeeze body.

9. The high frequency chest wall oscillation pump of claim 8, wherein each of the at least one cam surface is defined within a radial wall of the drive plate.

10. The high frequency chest wall oscillation pump of claim 9, wherein each of the at least one cam surface is formed as a radially inward facing surface engaged with the at least one squeeze body to drive the at least one squeeze body radially in reciprocal motion.

11. The high frequency chest wall oscillation pump of claim 9, wherein each of the at least one cam surface is formed as an annular surface.

12. The high frequency chest wall oscillation pump of claim 9, wherein each of the at least one cam surface is formed to have triangular shape.

13. The high frequency chest wall oscillation pump of claim 6, wherein the at least one cam includes at least two cams each engaged with the at least one squeeze body.

14. The high frequency chest wall oscillation pump of claim 13, wherein the at least one squeeze body includes at least three squeeze bodies each engaged with each of the at least two cams.

15. The high frequency chest wall oscillation pump of claim 1, wherein each of the at least one squeeze body extends longitudinally along a rotational axis of the drive shaft and defines a curved surface on a radially inner side.

16. The high frequency chest wall oscillation pump of claim 15, wherein the curved surface defines a convex curvature profile along the longitudinal extent of the squeeze body.

17. The high frequency chest wall oscillation pump of claim 1, wherein each at least one squeeze body includes at least one track follower for engagement with a track assembly for guiding reciprocating motion of the at least one squeeze body.

18. The high frequency chest wall oscillation pump of claim 17, wherein the at least one track follower includes at least two track followers, one track follower of the at least two track followers connected at each longitudinal end of the at least one squeeze body.

19. The high frequency chest wall oscillation pump of claim 17, wherein each at least one track follower is formed as an elongated-circular projection extending longitudinally from the at least one squeeze body.

20. The high frequency chest wall oscillation pump of claim 1, wherein each at least one squeeze body includes at least one cam follower for engagement with the at least one cam to receive cam actuation.

21. The high frequency chest wall oscillation pump of claim 20, wherein each at least one cam follower is formed as a cylindrical projection extending longitudinally from the at least one squeeze body.

22. The high frequency chest wall oscillation pump of claim 20, wherein each at least one cam follower includes at least two cam followers, one cam follower of the at least two cam followers connected at each longitudinal end of the squeeze body.

23. The high frequency chest wall oscillation pump of claim 1, further comprising a base pressure source in communication with the pressure cavity to provide base line pressure.

24. The high frequency chest wall oscillation pump of claim 1, wherein the squeeze assembly is adapted for three oscillations of the at least one diaphragm between the first and second positions to generate three pressure pulses for each revolution of the drive shaft.

25. A high frequency chest wall oscillation system comprising a therapy garment coupled with the high frequency chest wall oscillation pump of claim 1 to receive pressure oscillation.

* * * * *